(12) United States Patent
Sawada (10) Patent No.: US 12,535,502 B2
(45) Date of Patent: Jan. 27, 2026

(54) MEASURING DEVICE

(71) Applicant: FUJI CORPORATION, Aichi (JP)

(72) Inventor: Toshiyuki Sawada, Toyota (JP)

(73) Assignee: FUJI CORPORATION, Aichi (JP)

( * ) Notice: Subject to any disclaimer, the term of this patent is extended or adjusted under 35 U.S.C. 154(b) by 155 days.

(21) Appl. No.: 18/567,420

(22) PCT Filed: Jun. 14, 2021

(86) PCT No.: PCT/JP2021/022528
§ 371 (c)(1),
(2) Date: Dec. 6, 2023

(87) PCT Pub. No.: WO2022/264213
PCT Pub. Date: Dec. 22, 2022

(65) Prior Publication Data
US 2025/0116686 A1    Apr. 10, 2025

(51) Int. Cl.
*G01R 1/073*    (2006.01)
(52) U.S. Cl.
CPC .................... *G01R 1/073* (2013.01)
(58) Field of Classification Search
None
See application file for complete search history.

(56) References Cited

U.S. PATENT DOCUMENTS

| 4,212,075 A * | 7/1980 | Cleversey ............... B07C 5/344 |
|---|---|---|
| | | 324/73.1 |
| 2018/0203041 A1 | 7/2018 | Sawada et al. |
| 2019/0380236 A1 | 12/2019 | Sawada |

FOREIGN PATENT DOCUMENTS

| JP | 8-51048 A | 2/1966 |
|---|---|---|
| JP | 55-88388 A | 7/1980 |
| JP | 55-112263 U | 8/1980 |
| WO | WO 2017/009987 A1 | 1/2017 |

OTHER PUBLICATIONS

International Search Report mailed on Aug. 31, 2021 in PCT/JP2021/022528 filed on Jun. 14, 2021 (citing references 1, 15 & 16 therein, 2 pages).

* cited by examiner

*Primary Examiner* — Farhana A Hoque
(74) *Attorney, Agent, or Firm* — Oblon, McClelland, Maier & Neustadt, L.L.P.

(57) ABSTRACT

This is an improvement of a measuring device, for example, it is possible to stably measure an electrical characteristic even when a component is small. In the present measuring device, a recessed portion capable of accommodating at least a part of the components is provided in at least one of the pair of probes that grips the components. As described above, since a part of the components is accommodated in the recessed portion, it is possible to obtain at least one of the following: it is possible to more favorably grip the component by the pair of probes, and it is possible to grip the component at a fixed position by the pair of probes. As a result, it is possible to stably measure the electrical characteristic of the component.

7 Claims, 8 Drawing Sheets

MEASURING DEVICE

TECHNICAL FIELD

The present disclosure relates to a measuring device that measures an electrical characteristic of a component to be mounted on a circuit board.

BACKGROUND ART

Patent Literature 1 describes a measuring device to be installed on a mounter for mounting a component supplied by a component supply device on a circuit board, the measuring device being for measuring an electrical characteristic of the component, the measuring device including a loading stand on which the component is loaded, and a pair of probes that is capable of approaching and separating from each other. In the measuring device described in Patent Literature 1, the electrical characteristic of the component is measured by sandwiching the component loaded on the loading stand between the pair of probes.

PATENT LITERATURE

Patent Literature 1: Pamphlet of International Publication No. WO2017/009987

BRIEF SUMMARY

Technical Problem

A problem of the present disclosure is to improve a measuring device, and for example, to enable a stable measurement of an electrical characteristic even when the component is small.

Solution to Problem

In the measuring device according to the present disclosure, a recessed portion capable of accommodating at least a part of the components is provided in at least one of the pair of probes that grips the components. As described above, since at least a part of the components are accommodated in the recessed portion, it is possible to obtain at least one of the following: it is possible to more favorably grip the component by the pair of probes, and it is possible to grip the component at a fixed position by the pair of probes. As a result, it is possible to stably measure the electrical characteristic of the component.

BRIEF DESCRIPTION OF DRAWINGS

FIGS. 11A to 11D are operation diagrams of the measuring device, in which

DESCRIPTION OF EMBODIMENTS

Hereinafter, a mounter including a measuring device, which constitutes an embodiment of the present disclosure, will be described in detail based on drawings.

EXAMPLE

Figure 1:
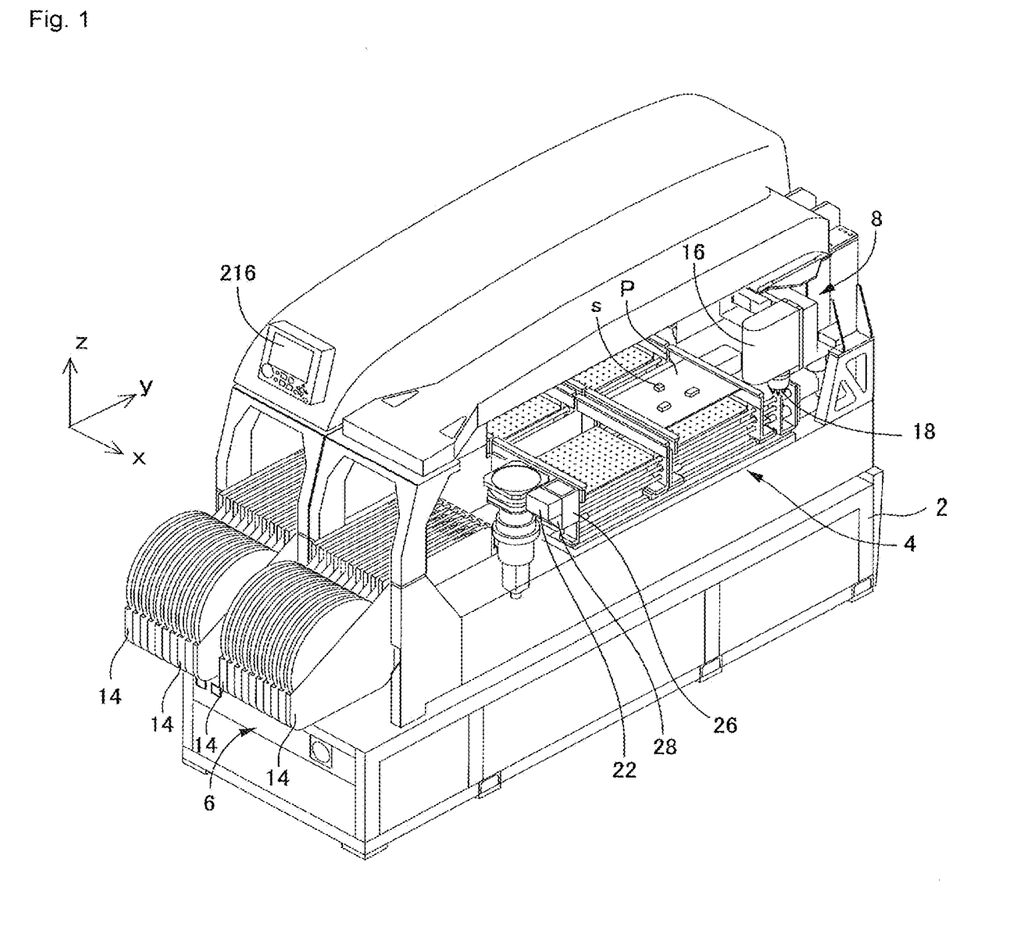
FIG. 1 is a perspective view of a mounter including a measuring device according to an embodiment of the present disclosure.

A mounter illustrated in FIG. 1 is intended to mount a component on a circuit board and includes main body 2, circuit board conveyance and holding device 4, component supply device 6, head moving device 8, and the like.

Circuit board conveyance and holding device 4 is intended to convey and hold circuit board P (hereinafter, referred simply to as board P) in a horizontal posture, and in FIG. 1, a conveyance direction of board P is referred to as an x direction, a width direction of board P is referred to as a y direction, and a thickness direction of board P is referred to as a z direction. The y direction is the front-rear direction of the mounter, and the z direction is the vertical direction. These x direction, y direction, and z direction are orthogonal to one another. Component supply device 6 is intended to supply electronic component (hereinafter, referred simply to as a component) s to be mounted on board P and includes multiple tape feeders 14 and the like. Head moving device 8 is intended to hold and move mounting head 16 in the x direction, y direction, and z direction, and mounting head 16 includes suction nozzle 18 that picks up and holds component s.

Reference numeral 22 denotes a measuring device. Measuring device 22 is intended to measure an electrical characteristic of component s. As the electrical characteristics of component s, L (inductance), C (capacitance), R (resistance), Z' (impedance), and the like correspond thereto, and one or more of these electrical characteristics are measured by measuring device 22.

Measuring device 22 is provided on a main body of circuit board conveyance and holding device 4 via collection box 26. Collection passage 28 is provided between collection box 26 and measuring device 22, and component s whose electrical characteristic is measured is accommodated in collection box 26 through collection passage 28.

As illustrated in FIGS. 2 to 6, measuring device 22 includes (i) main body 30, (ii) loading stand 32 on which component s is loaded, (iii) a pair of probes 37 including fixed element 34 and movable element 36, (iv) loading stand moving device 40 that moves loading stand 32, (v) movable element moving device 41 that causes movable element 36 to approach and separate from fixed element 34, (vi) electrical characteristics measuring section 42 (refer to FIG. 10) as an electrical characteristic acquisition section, and the like. In the present example, component s includes electrodes at both end portions, can be gripped by the pair of probes 37, and may be a square chip, for example. Main body 30 is provided with through hole 31 which can communicate with collection passage 28. In addition, main body 30 is grounded.

For example, measuring device 22 can be attached to the main body of circuit board conveyance and holding device 4 such that the direction where movable element 36 approaches and separates from fixed element 34 is the y direction, and the direction orthogonal to an approaching and separating direction is the x direction. The y direction is substantially a horizontal direction, and movable element 36 approaches and separates from fixed element 34 by the movement in the horizontal direction. Hereinafter, the y direction may be referred to as an approaching and separating direction or a longitudinal direction of movable element 36 or groove section 46 formed in loading stand 32 described later. In addition, movement in a direction where movable element 36 approaches fixed element 34 may be referred to as an advance, and movement in a direction where movable element 36 separates from fixed element 34 may be referred to as a retreat. The same will apply to the movement of loading stand 32. Furthermore, the x direction may be referred to as a width direction of movable element 36 or groove section 46.

Loading stand 32 includes component loading section 44 and loading section holding body 45 for holding component loading section 44. Component loading section 44 is held by loading section holding body 45 so as to be integrally movable, and loading section holding body 45 is provided on main body 30 so as to be movable in the y direction (approaching and separating direction).

Groove section 46 extending in the approaching and separating direction is formed in component loading section 44. As illustrated in FIG. 6A, groove section 46 is substantially V-shaped and includes upper groove section 46a having a pair of inclined side surfaces and lower groove section 46b provided at a lower portion of upper groove section 46a and having a substantially rectangular cross-section. Upper groove section 46a includes a pair of inclined surfaces 48a and 48b, and lower groove section 46b includes flat bottom surface 50 and a pair of wall surfaces 51a and 51b on both sides of bottom surface 50.

Component s loaded on component loading section 44 may be loaded on bottom surface 50 of lower groove section 46b or may be held by the pair of inclined surfaces 48a and 48b of upper groove section 46a and loaded thereon.

Cover portion 52 extending in the approaching and separating directions is attached to loading stand 32. Cover portion 52 includes a pair of side plates 52a and 52b positioned on both sides of groove section 46 of loading stand 32. The pair of side plates 52a and 52b is moved integrally with loading stand 32.

Each of fixed element 34 and movable element 36 have facing surfaces 34f and 36f facing each other, and component s is gripped by the pair of facing surfaces 34f and 36f. Fixed element 34 is fixed to main body 30 via fixed element holding body 55. Movable element 36 is held by movable element holding body 56 so as to be integrally movable, and movable element holding body 56 is provided on main body 30 so as to be movable in the y direction (approaching and separating direction). Fixed element holding body 55 and movable element holding body 56 are positioned on both sides of loading section holding body 45 in the approaching and separating direction. Each of fixed element 34 and movable element 36 is connected to electrical characteristics measuring section 42 via a copper wire.

In addition, in the present example, fixed element 34 includes main body portion 34h and abutting portion 34a serving as a recessed portion forming portion detachably provided with respect to main body portion 34h. Abutting portion 34a is detachably attached to main body portion 34h by bolt 34b as a fixing device. In the present example, a surface of abutting portion 34a facing movable element 36 is facing surface 34f.

Figure 7:
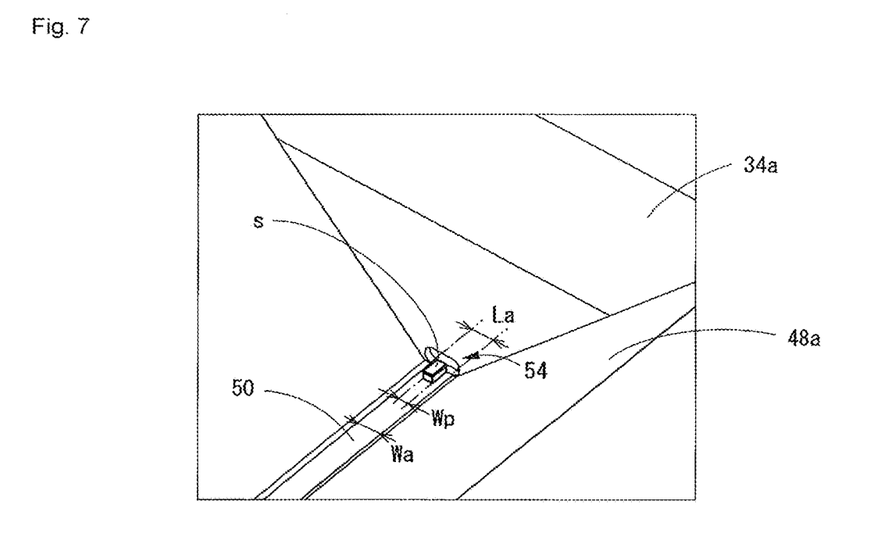
FIG. 7 is a perspective view of a main part of the measuring device.
Figure 8:
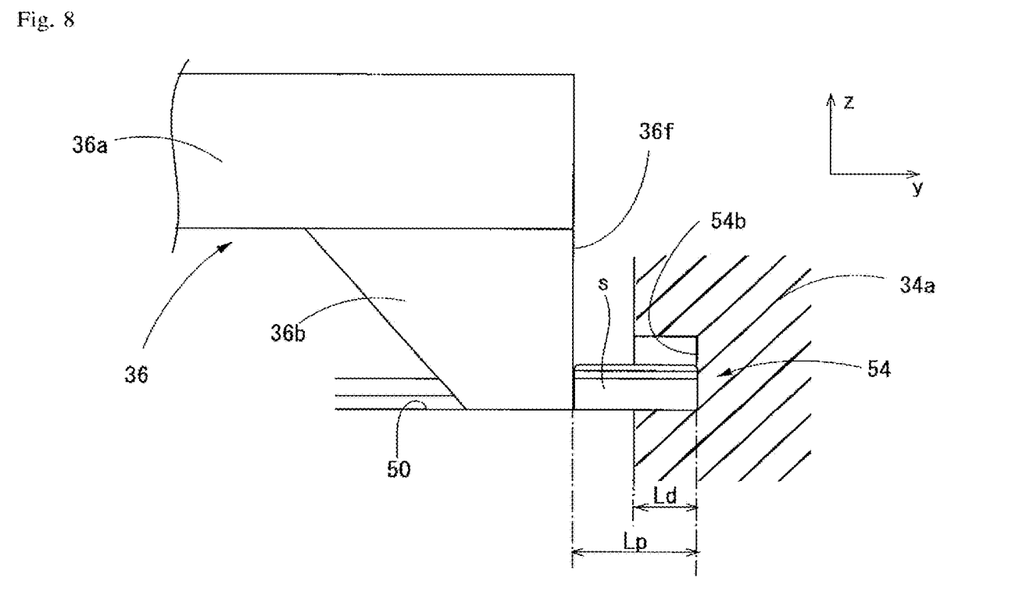
FIG. 8 is a side view (partial cross-sectional view) of a main part of the measuring device.

As illustrated in FIGS. 7 and 8, abutting portion 34a is provided with recessed portion 54 that is open in the approaching and separating direction so as to face groove section 46 of component loading section 44. Bottom surface 54b of recessed portion 54 is a flat surface and a surface extending in a direction orthogonal to the approaching and separating direction. In the present example, facing surface 34f includes bottom surface 54b of the recessed portion. Length La of the opening of recessed portion 54 in the x direction (the width direction of groove section 46) corresponds to length Wa of the width of bottom surface 50 (corresponding to the width of the bottom portion) of groove section 46. That is, width La of the opening of recessed portion 54 is substantially the same as width Wa of bottom surface 50 (La Wa).

Depth Ld of recessed portion 54 (the length from the opening to bottom surface 54b in the approaching and separating direction) is less than ½ of length Lp of component s (Ld<Lp/2). Component s is component s having width Wp smaller than width Wa of bottom surface 50 of groove section 46 (Wp<Wa), and in a case where there are multiple types of components s in which width Wp is smaller than width Wa of bottom surface 50, component s refers to smallest component s among multiple types of components s. As described above, by setting depth Ld to be less than ½ of length Lp of component s, component s can be favorably dropped from recessed portion 54 after the electrical characteristics of component s are measured.

Movable element 36 includes main body portion 36a having a substantially rectangular parallelepiped shape, and protruding portion 36b protruding downward from a front portion of main body portion 36a. Movable element 36 is held by movable element holding body 56 at the rear portion of main body portion 36a, and protruding portion 36b and main body portion 36a constituting the front portion enter groove section 46 of component loading section 44. In the present example, a front end surface of protruding portion 36b of movable element 36, or a front end surface of protruding portion 36b and (a part of) a front end surface of main body portion 36a are facing surfaces 36f.

Main body portion 36a is provided in a posture in which the longitudinal direction of the rectangular parallelepiped body extends in the approaching and separating direction.

As illustrated in FIGS. 6B and 6C, protruding portion 36b has a size and a shape engageable with groove section 46. Protruding portion 36b includes lower groove engaging portion 57 engaged with lower groove section 46b and upper groove engaging portion 58 engaged with a part of upper groove section 46a. Upper groove engaging portion 58 includes a pair of inclined surfaces 58a and 58b facing a part of the pair of inclined surfaces 48a and 48b of groove section 46. Each of lower groove engaging portions 57 includes bottom surface 50 of lower groove section 46b, lower end surface 57d facing the pair of wall surfaces 51a and 51b, and a pair of side surfaces 57a and 57b. Main body portion 36a is separated from the pair of inclined surfaces 48a and 48b of groove section 46.

Figure 3:
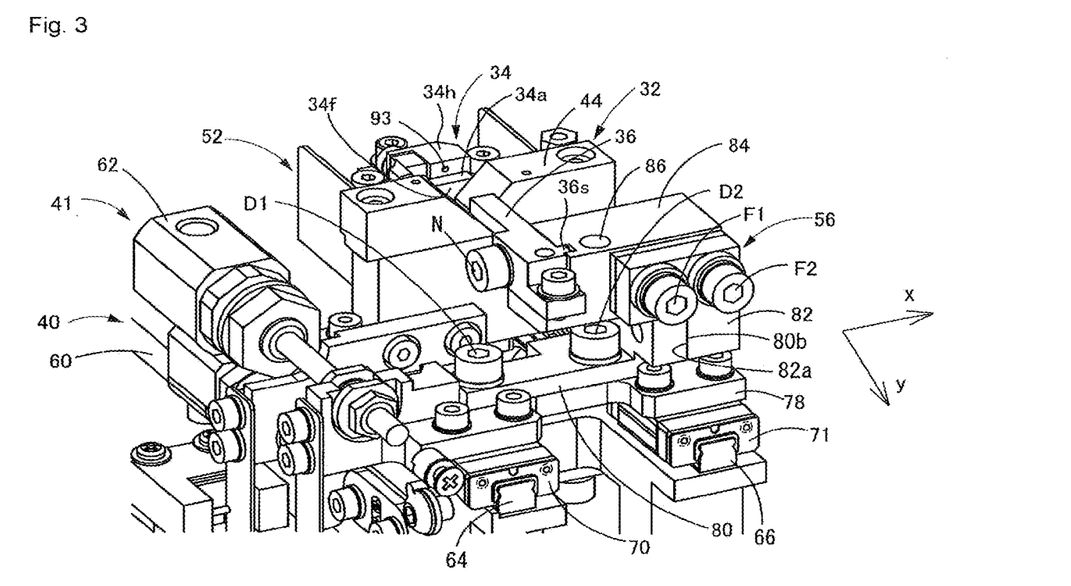
FIG. 3 is a side view of the measuring device.
Figure 9:
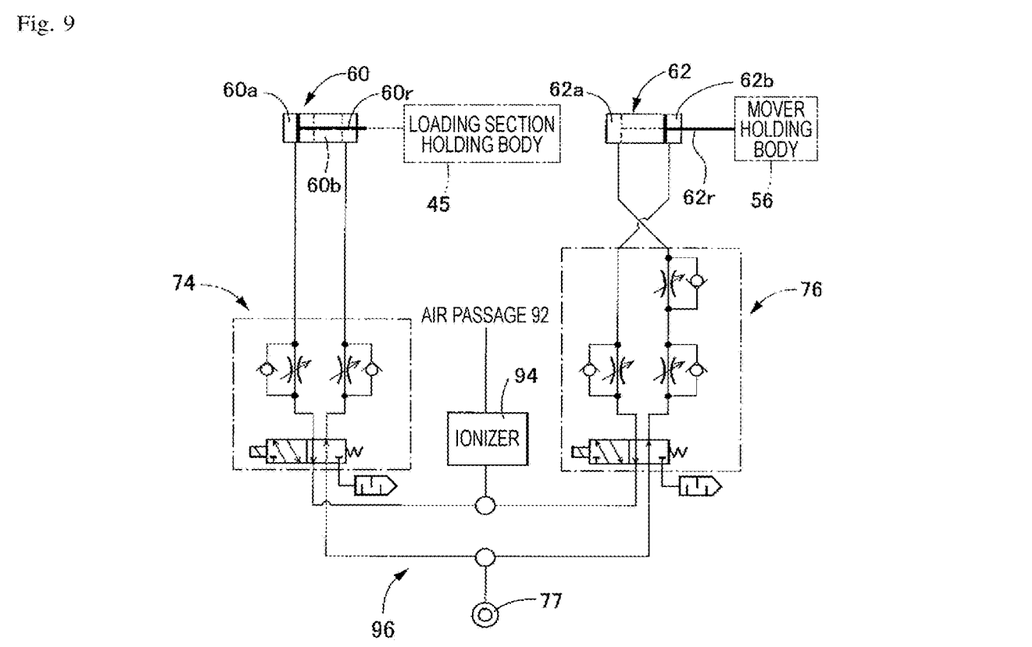
FIG. 9 is an air circuit diagram provided in the measuring device.

As illustrated in FIG. 3, each of loading stand moving device 40 and movable element moving device 41 includes air cylinders 60 and 62 as driving sources, a pair of guide rails 64 and 66 provided on main body 30, a pair of loading stand sliders 68 and 69 and a pair of movable element sliders 70 and 71 which are movably engaged with guide rails 64 and 66, solenoid valve devices 74 and 76 (refer to FIGS. 9 and 10), air source 77, and the like.

The pair of guide rails 64 and 66 is fixed to main body 30 in a posture extending in the y direction (approaching and separating direction) while being separated in the x direction (width direction of movable element 36). In addition, loading section holding body 45 is fixed to loading stand sliders 68 and 69. Movable element holding body 56 is fixed to each of movable element sliders 70 and 71. Furthermore, piston rod 60r (refer to FIG. 9) of air cylinder 60 is attached to loading section holding body 45, and piston rod 62r of air cylinder 62 is attached to movable element holding body 56. Air cylinders 60 and 62 are provided in a posture in which piston rods 60r and 62r extend in the approaching and separating directions.

Meanwhile, air passage 92 is provided in a member on the fixed element side {for example, an upper portion of fixed element 34, fixed element holding body 55, or the like}. Air passage 92 includes opening 93 which opens in a portion of the member on the fixed element side which faces facing surface 36f of movable element 36. In addition, ionizer 94 is connected to air passage 92. Ionizer 94 is intended to ionize air by generating a corona discharge.

Solenoid valve device 74 is provided between two air chambers 60a and 60b of air cylinder 60, air source 77, air passage 92, and a filter (atmosphere). Movement of loading stand 32 or the like is controlled by the control of solenoid valve device 74.

Air source 77, air passage 92, and the filter (atmosphere) are selectively connected to air chambers 62a and 62b of air cylinder 62 via solenoid valve device 76. Movement or the like of movable element holding body 56 (movable element 36) is controlled by the control of solenoid valve device 76. In addition, when loading stand 32 is advanced or when movable element 36 is retreated, air is supplied from air cylinders 60 and 62 to air passage 92 and air is caused to flow out from opening 93.

In the present example, air passage 92, air source 77, air cylinders 60 and 62, and the like constitute air supply device 96. Air supply device 96 has elements common to movable element moving device 41 and loading stand moving device 40.

In the present example, movable element 36 is held by movable element holding body 56 so that a height which is a position in the vertical direction as the z direction with respect to main body 30 of movable element 36, a position in the width direction of movable element 36 as the x direction, and an inclination around axis X extending in the x direction can be adjusted.

In the present example, the front portion of movable element 36 has a shape and size that can be engaged with groove section 46. In addition, movable element 36 is assembled to movable element holding body 56 in a state where the gap between movable element 36 and groove section 46 is significantly small. Therefore, even in a case where component s is small and is loaded on bottom surface 50 of groove section 46, component s is gripped by facing surface 36f of movable element 36 and facing surface 34f of fixed element 34, and the electrical characteristic can be measured.

Figure 13:
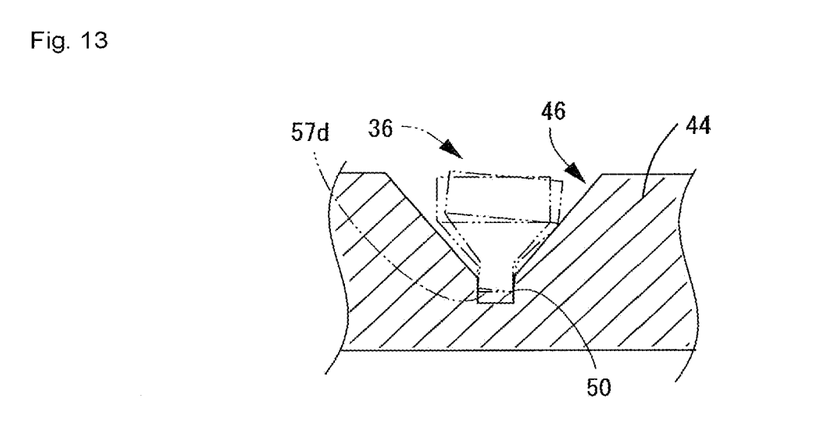
FIG. 13 is a view illustrating a main part of a conventional measuring device.

However, in a case where movable element 36 enters groove section 46 due to an assembly error or the like of movable element 36 with respect to movable element holding body 56, as illustrated in FIG. 13, a gap may be generated between movable element 36 and groove section 46, for example, between lower end surface 57d of movable element 36 and bottom surface 50 of groove section 46. Therefore, the pair of facing surfaces 34f and 36f cannot grip component s loaded on bottom surface 50, and the electrical characteristic cannot be measured, or component s cannot be favorably gripped, and the electrical characteristic cannot be measured with high accuracy.

Therefore, in the present example, the position of movable element 36 in the vertical direction with respect to main body 30, the position of movable element 36 in the width direction, and the inclination around axis X can be adjusted, and thus the relative positional relationship between movable element 36 and groove section 46 of component loading section 44 can be adjusted.

As illustrated in FIGS. 2 to 5, movable element holding body 56 includes holding body main body 78 fixed to the pair of movable element sliders 70 and 71, widthwise movable member 80 attached to holding body main body 78 by two bolts D1 and D2, pivoting member 82 attached to widthwise movable member 80 by bolts E1 and E2, and vertically movable member 84 attached to pivoting member 82 by bolts F1 and F2. Movable element 36 is attached to vertically movable member 84 by bolt N so as to be integrally movable.

Bolts D1 and D2 extend in the vertical direction, penetrate through widthwise movable member 80, and are screwed into holding body main body 78, bolts E1 and E2 extend in the width direction of movable element 36, penetrate through pivoting member 82, and are screwed into widthwise movable member 80, and bolts F1 and F2 extend in the approaching and separating direction, penetrate through pivoting member 82, and are screwed into vertically movable member 84. The state where the bolt is tightened and the two members cannot move relative to each other is referred to as a fixed state.

Bolts D1 and D2 are loosened in a state where pivoting member 82 is fixed to widthwise movable member 80 by bolts E1 and E2 and vertically movable member 84 is fixed to pivoting member 82 by bolts F1 and F2. Widthwise movable member 80, pivoting member 82, vertically movable member 84, and movable element 36 are integrally movable in the width direction of moveable element 36. Since widthwise movable member 80 and holding body main body 78 are provided with gap R11 therebetween in the x direction, widthwise movable member 80 is caused to move in the x direction with respect to holding body main body 78.

By moving widthwise movable member 80 and the like in the width direction of movable element 36 along the upper surface of holding body main body 78, the position of movable element 36 in the width direction is adjusted, and bolts D1 and D2 are tightened. The position of movable element 36 in the width direction can be adjusted within the range of the gap between bolts D1 and D2 and the through hole of widthwise movable member 80. The operation of bolt D2 is performed using through hole 86 formed in vertically movable member 84 and penetrating in the vertical direction. The jig is passed via through hole 86 and engaged with the head of bolt D2 to loosen or tighten bolt D2.

Figure 5:
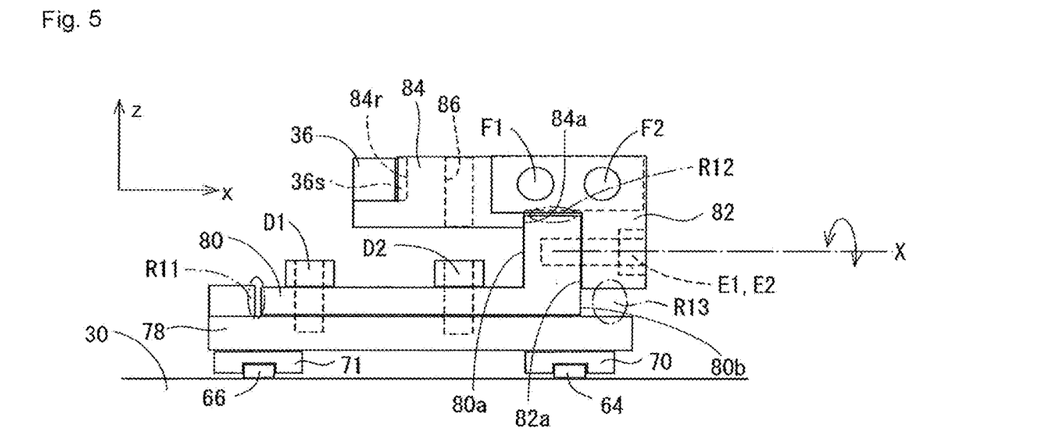
FIG. 5 is a rear view of the measuring device.
Figure 6:
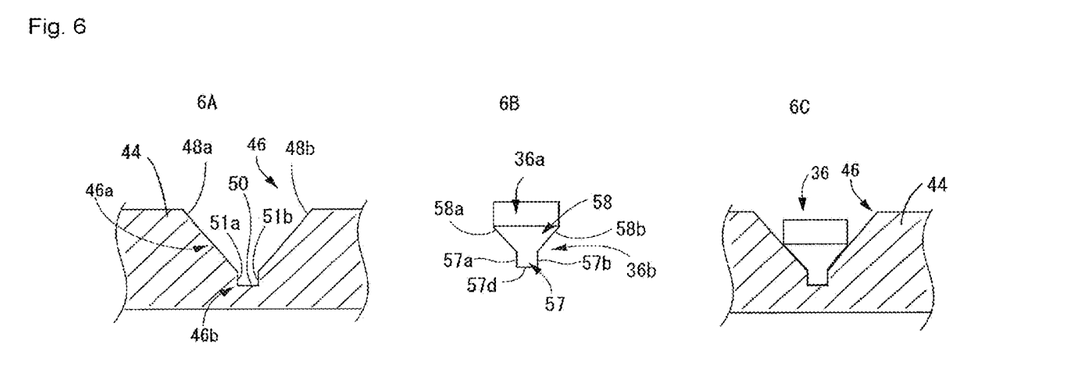
FIG. 6A is a cross-sectional view of a groove section of a loading stand of the measuring device.
FIG. 6B is a front view of a movable element of the measuring device.
FIG. 6C is a view illustrating a state where the movable element enters the groove section of the loading stand of the measuring device.

Bolts F1 and F2 are loosened, in a state where widthwise movable member 80 is fixed to holding body main body 78 by bolts D1 and D2, and pivoting member 82 is fixed to widthwise movable member 80 by bolts E1 and E2. Accordingly, vertically movable member 84 and movable element 36 are movable in the vertical direction with respect to widthwise movable member 80 and pivoting member 82. The vertical movement of vertically movable member 84 is allowed by gap R12 in the vertical direction between vertically movable member 84, widthwise movable member 80, and pivoting member 82. In addition, as illustrated in FIG. 5, since step surface 84a of vertically movable member 84 and inner side surface 80a of widthwise movable member 80 abut on each other, the movement of vertically movable member 84 in the x direction is restricted.

Vertically movable member 84 and the like are moved in the vertical direction along widthwise movable member 80 and the height which is the position of movable element 36 in the vertical direction is adjusted to tighten bolts F1 and F2. The position of movable element 36 in the vertical direction can be adjusted within the range of the gap between bolts F1 and F2 and the through hole of pivoting member 82.

Bolts E1 and E2 are loosened in a state where widthwise movable member 80 is fixed to holding body main body 78 by bolts D1 and D2 and vertically movable member 84 is fixed to pivoting member 82 by bolts F1 and F2. Accordingly, pivoting member 82, vertically movable member 84, and movable element 36 are pivotable around axis X with respect to widthwise movable member 80. The pivoting of pivoting member 82 around axis X is allowed by gap R13 between pivoting member 82 and holding body main body 78 in the vertical direction, gap R12 between pivoting member 82 and widthwise movable member 80 in the vertical direction, and the like. In addition, since inner side surface 82a of pivoting member 82 and outer side surface 80b of widthwise movable member 80 abut on each other, the movement of pivoting member 82 in the x direction is restricted.

When pivoting member 82 (and vertically movable member 84 and movable element 36) is pivoted around axis X, the inclination of movable element 36 around the X axis is adjusted to tighten bolts E1 and E2. Accordingly, the inclination of movable element 36 around the X axis can be adjusted.

Figure 2:
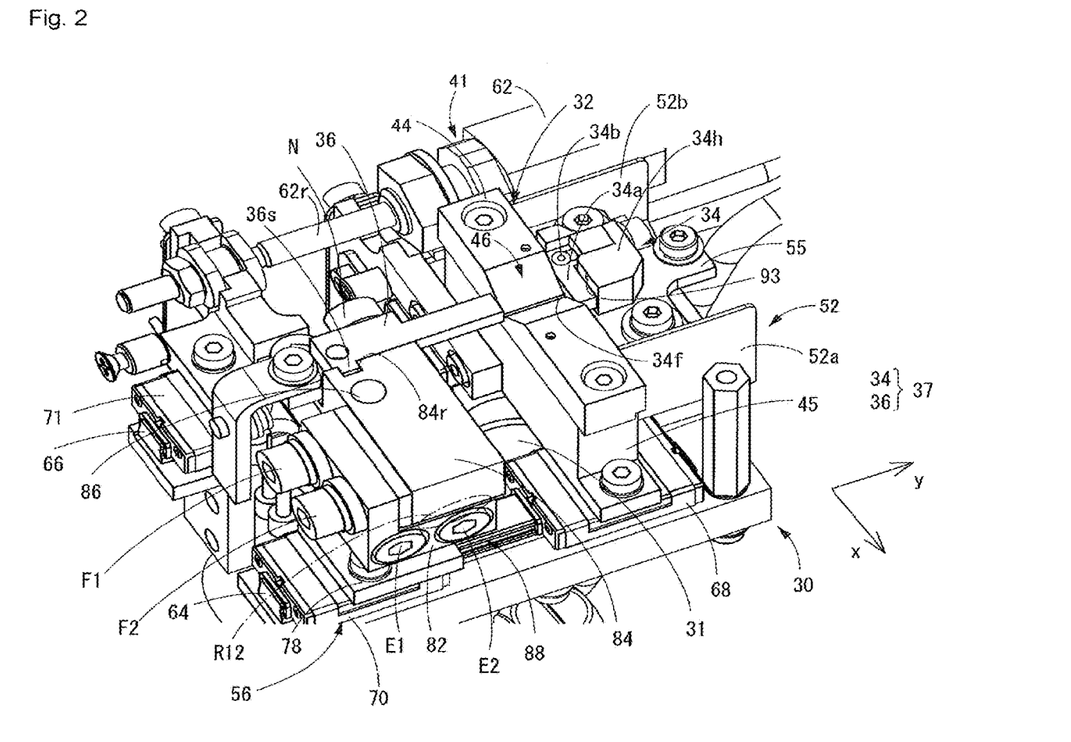
FIG. 2 is a perspective view of the measuring device.
Figure 4:
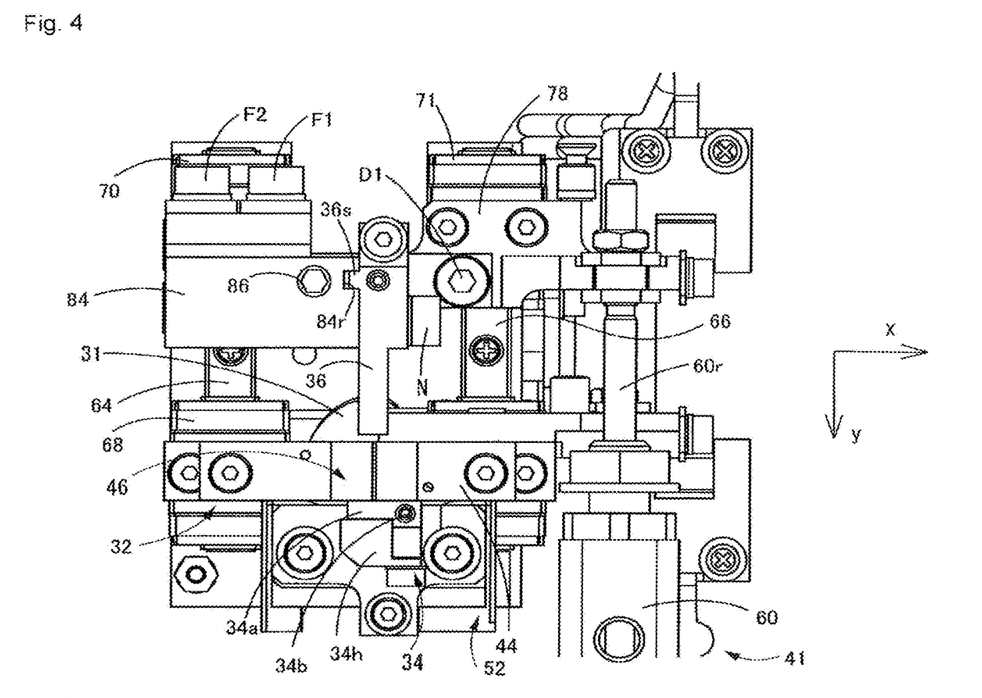
FIG. 4 is a plan view of the measuring device.

Although movable element 36 is fixed to vertically movable member 84 by bolt N, as illustrated in FIGS. 2 and 4, protruding portion 36s provided on a side surface of movable element 36 and extending in the vertical direction is fitted into recessed portion 84r provided on vertically movable member 84 and extending in the vertical direction. Therefore, in a state where bolt N is loosened, movable element 36 can move in the vertical direction relative to vertically movable member 84. The position of movable element 36 in the vertical direction can also be adjusted by moving movable element 36 in the vertical direction with respect to vertically movable member 84.

For example, in a state where movable element 36 enters groove section 46 of loading stand 32, these operations can be performed by an operator by measuring the gaps between movable element 36 and groove section 46 using a jig such as a dial gauge and a strain gauge so as to reduce the gaps.

In the present example, widthwise movable member 80, pivoting member 82, vertically movable member 84, bolt N, bolts D1 and D2, bolts E1 and E2, bolts F1 and F2, protruding portion 36s provided on movable element 36, recessed portion 84r provided on vertically movable member 84, and the like constitute adjustment mechanism 88.

Figure 10:
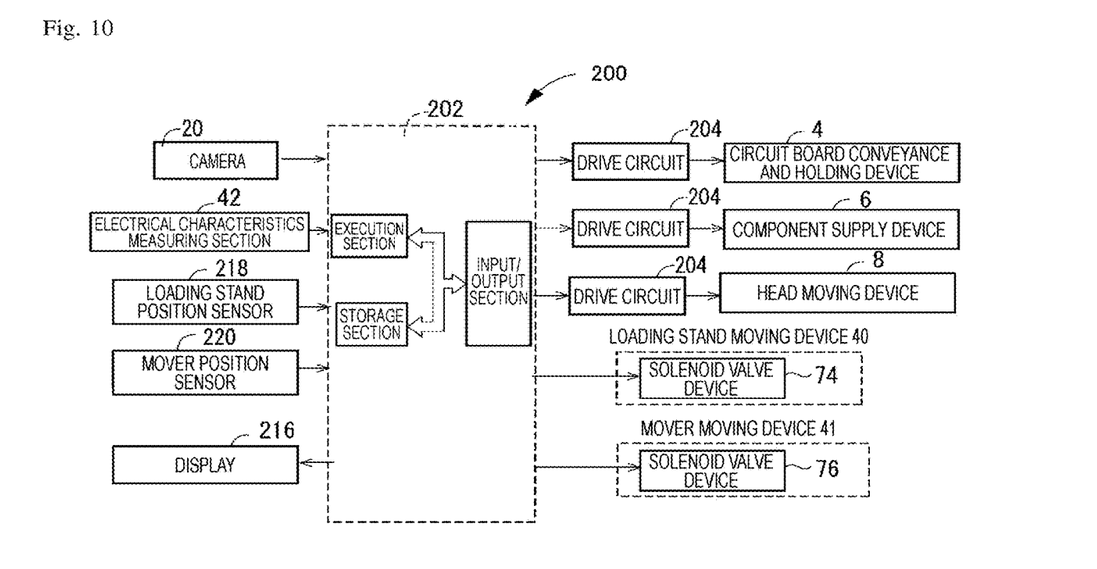
FIG. 10 is a block diagram conceptually illustrating a periphery of a control device of the measuring device.

The mounter includes control device 200. As illustrated in FIG. 10, control device 200 includes controller 202 mainly including a computer, and multiple drive circuits 204. Each of circuit board conveyance and holding device 4, component supply device 6, and head moving device 8 is connected to controller 202 via drive circuit 204, and solenoid valve devices 74 and 76 of loading stand moving device 40 and movable element moving device 41 are connected to controller 202. In addition, camera 20, electrical characteristics measuring section 42, display 216, loading stand position sensor 218, movable element position sensor 220, and the like are connected. Solenoid valve devices 74 and 76 are controlled based on output signals of loading stand position sensor 218 and movable element position sensor 220, and the like. In addition, the measurement result of the electrical characteristic of component s can be displayed on display 216.

Figure 11A:
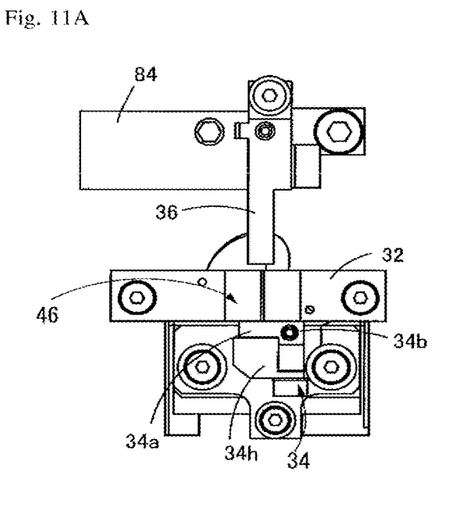
FIG. 11A is a diagram illustrating an initial state.

In measuring device 22 configured as described above, an operation in a case where the electrical characteristic of component s is measured will be described. Measuring device 22 is normally in an initial state illustrated in FIG. 11A. Movable element 36 is at a retreated end position and loading stand 32 is at an advanced end position. When an instruction to measure the electrical characteristic of component s is issued, mounting head 16 is moved. Component s is held and moved to be loaded in groove section 46 by suction nozzle 18.

Figure 11B:
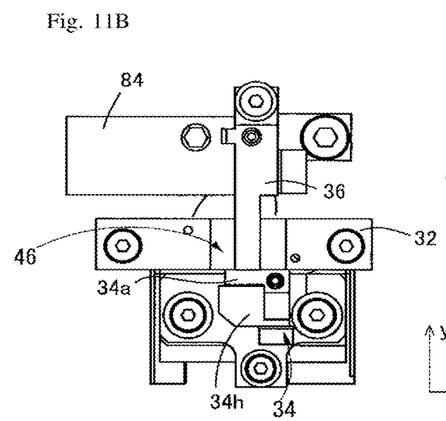
FIG. 11B is a diagram illustrating a clamped state.
Figure 11C:
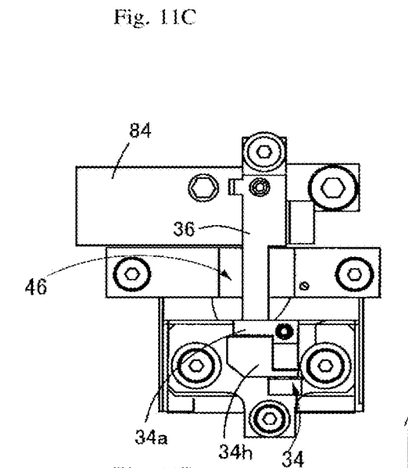
FIG. 11C is a diagram illustrating a measurement state.

Movable element 36 is caused to advance by the control of solenoid valve device 76, and component s is clamped by movable element 36 and fixed element 34 as illustrated in FIG. 11B. Next, as illustrated in FIG. 11C, loading stand 32 is retreated by the control of solenoid valve device 74. Loading stand 32 is retreated to a position separated from component s and the pair of probes 37, in other words, a position where protruding portion 36b of movable element 36 is separated from groove section 46.

Meanwhile, the electrical characteristic of component s is measured after the elapse of the static electricity removal time which is the set time from the time when component s is loaded on groove section 46. The static electricity removal time is a time during which static electricity charged on component s is removed, and is determined in advance. After the measurement of the electrical characteristic of component s is completed, movable element 36 is caused to retreat, and component s gripped between movable element 36 and fixed element 34 is released. In addition, as movable element 36 retreats, the air is supplied obliquely from above to facing surface 36f of movable element 36 from opening 93.

Figure 11D:
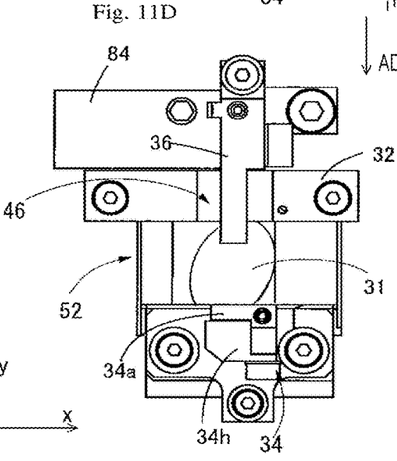
FIG. 11D is a diagram illustrating a disposal state.

Next, as illustrated in FIG. 11D, movable element 36 is further retreated, and loading stand 32 is retreated. Since the space between movable element 36 and fixed element 34 communicates with collection passage 28, component s can be collected into collection box 26. Thereafter, loading stand 32 is advanced and positioned between the pair of facing surfaces 34f and 36f. A space is defined above groove section 46, component s can be loaded therein, and measuring device 22 is restored to the initial state illustrated in FIG. 11A. In addition, since air containing ions is supplied to facing surface 36f of movable element 36 as loading stand 32 advances, it is also possible to remove static electricity from facing surface 36f.

In the present example, fixed element 34 is provided with recessed portion 54 that is open so as to face an end portion of groove section 46. Component s loaded on bottom surface 50 of groove section 46 is moved along bottom surface 50 by the advance of movable element 36, and abuts against bottom surface 54b of recessed portion 54. Component s is gripped by facing surface 36f of movable element 36 and facing surface 34f of fixed element 34 (bottom surface 54b of recessed portion 54). Therefore, even when component s is small, component s can be favorably gripped by the pair of facing surfaces 34f and 36f, and the electrical characteristic of component s can be stably measured, In addition, the electrical characteristic of component s is measured in a state where component s is accommodated in recessed portion 54 and abuts on bottom surface 54b. As described above, when the electrical characteristics are measured, the postures of components s can be substantially the same, and the positions of the components s can be substantially the same. The electrical characteristics of component s can be measured in a fixed posture and a predetermined position. As a result, the electrical characteristics of component s can be measured more stably, and the measurement accuracy can be improved.

Furthermore, since the depth of recessed portion 54 is less than ½ of the length of component s, component s can be favorably dropped when the pair of facing surfaces 34f and 36f is separated from each other.

In a state where the pair of facing surfaces 34f and 36f are separated from each other, cover portion 52 is located on both sides between the pair of facing surfaces 34f and 36f. Therefore, air is ejected from opening 93 as movable element 36 retreats, and circulates inside cover portion 52. Accordingly, component s accommodated in recessed portion 54 can be favorably dropped.

Furthermore, since the relative positional relationship of movable element 36 with respect to main body 30 can be adjusted, the relative positional relationship of movable element 36 with respect to groove section 46 of component loading section 44 can be adjusted, and the gap between protruding portion 36b of movable element 36 and groove section 46 can be made small or close to zero. As a result, component s can be more favorably gripped by the pair of facing surfaces 34f and 36f, and the electrical characteristics of component s can be stably measured.

Furthermore, component loading section 44 is in a state of being electrically conducted to main body 30 via loading section holding body 45 and guide rails 64 and 66, and movable element 36 is in a state of being electrically conducted to main body 30 via movable element holding body 56 and guide rails 64 and 66. Therefore, the static electricity removal of component s and the static electricity removal of loading stand 32, movable element 36, and the like are favorably performed. In particular, the static electricity removal of loading stand 32 and movable element 36 can be performed whether loading stand 32 and movable element 36 (movable element holding body 56) are in the halt state or the moving state. Therefore, the electrical characteristic of component s can be stably measured. Even when component s has a small impedance, the impedance of component s can be measured with high accuracy.

In the above example, although the pair of probes is moved in the horizontal direction so as to approach and separate from each other, the pair of probes can be capable of approaching and separating by being moved in the vertical direction.

In addition, in the above example, although the relative positional relationship between movable element 36 and component loading section 44 is adjusted by adjusting the relative positional relationship of movable element 36 with respect to main body 30, by adjusting the relative positional relationship between component loading section 44 and main body 30, the relative positional relationship between movable element 36 and component loading section 44 can be adjusted.

Figure 12:
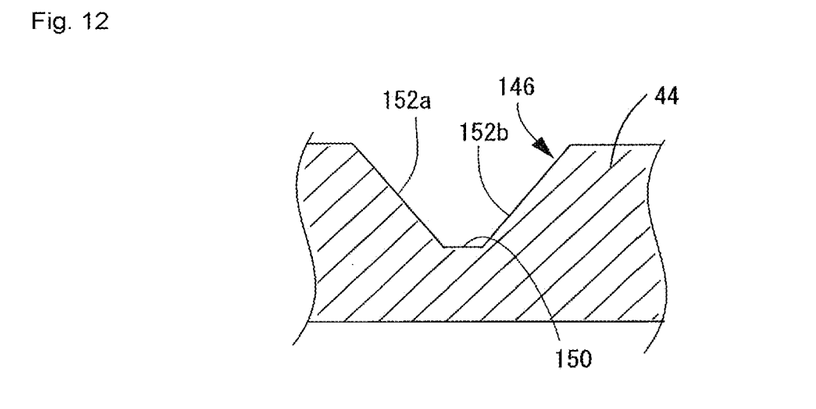
FIG. 12 is a cross-sectional view of another groove section provided in the loading stand.

Furthermore, the shape of groove section 46 is not limited. For example, as illustrated in FIG. 12, groove section 146 may have a shape including flat bottom surface 150 and a pair of inclined surfaces 152a and 152b. In this case, the width of the opening of recessed portion 54 provided in abutting portion 34a of fixed element 34 can be substantially the same as the width of bottom surface 150 (corresponding to the width of the bottom portion).

In addition, in a case where there are multiple types of components s whose width Wp is smaller than the width of bottom surface 50 of groove section 46 or the width of bottom surface 150 of groove section 146, depth Ld of recessed portion 54 may be less than ½ of length Lp of the component whose length is intermediate among multiple types of components s, or may be less than ½ of length Lp of the component having the largest length.

Hereinbefore, in addition to the aspects described in the embodiments, the present disclosure can be implemented with various changes and improvements based on the knowledge of those skilled in the art.

REFERENCE SIGNS LIST

22: Measuring device, 30: Main body, 32: Loading stand, 34: Fixed element, 36: Movable element, 36s: Protruding portion, 42: Electrical characteristic measuring section, 46: Groove section, 56: Movable element holding body, 80: Widthwise movable member, 82: Pivoting member, 84: Vertically movable member, 84r: Recessed portion, 86: Through hole, D1, D2, E1, E2, F1, F2, N: Bolt

The invention claimed is:

1. A measuring device to be installed on a mounter for mounting a component supplied by a component supply device on a circuit board, the measuring device comprising:
    a pair of probes configured to approach and separate, the measuring device configured to measure an electrical characteristic of the component by the pair of probes gripping the component; and
    a loading stand on which the component is loaded, the loading stand including a groove section that extends in an approaching and separating direction which is a direction that the pair of probes approach and separate, wherein
    a recessed portion is formed in at least one of the pair of probes that grips the component, the recessed portion is opened to face the groove section, and a length of the opening in a width direction is a length corresponding to a width of a bottom portion of the groove section.

2. The measuring device according to claim 1, further comprising:
    the pair of probes grips the component loaded on the loading stand while approaching substantially in a horizontal direction.

3. The measuring device according to claim 1, wherein the groove section includes an upper groove section having a pair of inclined side surfaces and a lower groove section provided at a lower portion of the upper groove section and having a substantially rectangular cross-section.

4. The measuring device according to claim 1, wherein a depth of the recessed portion is less than ½ of a length of the component.

5. The measuring device according to claim 1, wherein the at least one of the pair of probes each includes a main body portion and a recessed portion forming portion having at least a portion in which the recessed portion is formed, and the recessed portion forming portion is detachably provided with respect to the main body portion.

6. The measuring device according to claim 1, wherein the pair of probes includes a fixed element and a movable element configured to approach and separate from the fixed element, and the recessed portion is formed in a portion of the fixed element facing the movable element.

7. A measuring device to be installed on a mounter for mounting a component supplied by a component supply device on a circuit board, the measuring device comprising:

a pair of probes configured to approach and separate, the measuring device configured to measure an electrical characteristic of the component by the pair of probes gripping the component;

a recessed portion is formed in at least one of the pair of probes that grips the component; and a loading stand including a groove section on which the component is loaded, wherein the groove section extends in an approaching and separating direction which is a direction of that the pair of probes approach and separate, the pair of probes includes a fixed element and a movable element configured to approach and separate from the fixed element, and the measuring device further comprises an adjustment mechanism configured to adjust a relative positional relationship between the movable element and the loading stand.

* * * * *